United States Patent
Stoodley et al.

(10) Patent No.: US 7,185,337 B2
(45) Date of Patent: Feb. 27, 2007

(54) EFFICIENT LOCKING FOR THREAD-SAFE SELF-MODIFYING CODE

(75) Inventors: Kevin A. Stoodley, Richmond Hill (CA); Andrew Low, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 09/867,362

(22) Filed: May 29, 2001

(65) Prior Publication Data

US 2002/0166016 A1 Nov. 7, 2002

(30) Foreign Application Priority Data

May 2, 2001 (CA) .................................... 2346766

(51) Int. Cl.
  G06F 9/455 (2006.01)
  G06F 9/00 (2006.01)
  G06F 7/00 (2006.01)
  G06F 12/00 (2006.01)
  G06F 13/22 (2006.01)

(52) U.S. Cl. .......................... 718/1; 712/226; 712/228; 712/244; 707/2; 707/206; 710/200; 710/220

(58) Field of Classification Search ............ 718/1–108; 712/226–244; 710/200–220; 707/2, 206
See application file for complete search history.

(56) References Cited

U.S. PATENT DOCUMENTS

| 5,274,823 | A  |   | 12/1993 | Brenner et al. ............ 395/725 |
| 5,408,629 | A  |   | 4/1995  | Tsuchiya et al. ............ 395/425 |
| 5,511,178 | A  |   | 4/1996  | Takeda et al. ............... 395/452 |
| 5,560,018 | A  |   | 9/1996  | Macon, Jr. et al. .......... 395/733 |
| 5,768,610 | A  | * | 6/1998  | Pflum ............................ 712/23 |
| 5,790,851 | A  |   | 8/1998  | Frank et al. ................. 395/674 |
| 5,845,298 | A  | * | 12/1998 | O'Connor et al. .......... 707/206 |
| 5,991,845 | A  |   | 11/1999 | Bohannon et al. .......... 710/200 |
| 6,000,028 | A  | * | 12/1999 | Chernoff et al. ............ 712/226 |
| 6,108,757 | A  |   | 8/2000  | Arshad ........................ 711/152 |
| 6,269,436 | B1 | * | 7/2001  | Tran et al. ..................... 712/23 |
| 6,446,149 | B1 | * | 9/2002  | Moriarty et al. ............ 710/110 |
| 6,842,853 | B1 | * | 1/2005  | Bush et al. .................. 712/228 |
| 6,934,832 | B1 | * | 8/2005  | Van Dyke et al. .......... 712/244 |
| 7,007,005 | B2 | * | 2/2006  | Rautenback et al. ........... 707/2 |
| 2002/0042807 | A1 | * | 4/2002 | Thomas et al. ................ 709/1 |

* cited by examiner

Primary Examiner—Meng-Al T. An
Assistant Examiner—Jennifer N. To
(74) Attorney, Agent, or Firm—John L. Rogitz

(57) ABSTRACT

A locking mechanism for use in a multi-thread environment supporting self-modifying code in which modifications to the code are made at runtime. The locking mechanism having associated helper code accessed by a call from the first instruction address in the code block. The helper code calculating the binary encoding for the call instruction and using an atomic compare and exchange instruction to compare the calculated binary encoding with the actual contents of the first instruction address. Where there is a match, a self loop instruction is written to the first instruction address to lock the specified code block for subsequent threads. The helper code contains instructions to resolve the references in the specified block. The last such instruction is an atomic store operation to replace the self loop instruction at the first instruction address with the appropriate modified instruction.

21 Claims, 1 Drawing Sheet

EFFICIENT LOCKING FOR THREAD-SAFE SELF-MODIFYING CODE

FIELD OF THE INVENTION

The present invention is directed to an improvement in computing systems and in particular to an improvement in locking for multiprocessor computer systems supporting thread-safe self-modifying code.

BACKGROUND OF THE INVENTION

Executable code for a computer may, as part of its runtime operation, carry out self-modifying operations. One common example of such self-modifying executable code is where executable code contains unresolved data or procedure references. This will occur, for example, where Java language code is dynamically compiled to produce code that calls methods and refers to data that is unresolved at compile time. One approach to permit the compiled code to be executed correctly is to resolve the previously unresolved references at the time that the code is first executed. The compiler generates executable code for calling a routine, sometimes referred to as helper code, which carries out reference resolution at runtime. The helper code is typically provided with the compiler.

When, during execution, the unresolved reference is reached, the helper code is provided with data identifying the reference to be resolved and is then executed. The helper code carries out instructions to resolve the previously unresolved method call or data references in the code. The helper code modifies the executable code by overwriting the unresolved references with the proper values which the helper code has determined at execution time. This ensures that the runtime resolution of the reference occurs only once. The code generated by such a compiler is referred to as "self-modifying" because the code's call to the helper code results in the replacement of a portion of the executable code (originally containing the unresolved references) with modified code which has resolved references.

In multiprocessor computers, self-modification of code at execution time may occur for the above, or other reasons. Such self-modification may create errors if different threads or processes execute a section of code which is in the process of being modified by another process or thread. To prevent this potential problem (race condition), different solutions have been proposed in the prior art. One approach is to implement a global locking arrangement. This requires a process or thread to obtain a global lock to modify a given section of code. The use of a global lock prevents multiple threads from executing the code to be modified, but there is a significant overhead involved as the processes or threads waiting on the global lock are unable to carry out other processing that may be unrelated to the code being modified.

Other solutions have been devised which rely on local lock arrangements. For example, a byte or word may be reserved for each code site being modified. Threads will lock on the byte or word for the code site. This approach has a cost in the code space required to implement the specific locks for each code site. This approach must also include code to avoid the potential race condition where a processor is executing in the area of code being modified at the time that the code is being updated, but before the processor reaches code to determine whether the lock is available or not.

Another solution is to add control flow to the section of code being modified to protect the code by preventing access to the code by other threads until the code has been modified. This approach will leave orphaned control flow statements in the executable code even after the modification of the code has taken place.

It is also possible to add a level of indirection in the code which calls the routine (the helper code) that resolves the reference. A locking mechanism may be more readily implemented for such a calling arrangement but the resulting code will be slower than otherwise due to the introduction of the additional level of indirection.

It is therefore desirable to have a mechanism for locking in a multi-processor thread-safe environment to permit the runtime modification in self-modifying code such that the resulting code is efficient and potential race conditions are eliminated.

SUMMARY OF THE INVENTION

According to an aspect of the present invention there is provided an improved locking mechanism for multiprocessor computer systems supporting thread-safe self-modifying code. According to another aspect of the present invention there is provided a computer program product including a computer usable medium having computer readable program code means embodied in the medium for defining code to provide a locking mechanism for self-modifying code in a multi-thread environment, the self-modifying code including helper code callable to modify instructions in a defined block of the self-modifying code, the computer program product including computer readable program code means for defining an atomic compare and exchange instruction in the locking mechanism, the defined compare and exchange instruction carrying out a comparison of an unreserved lock value with a first instruction in the defined block of self-modifying code, the defined compare and exchange instruction exchanging the first instruction in the defined block of self-modifying code with a self-loop instruction, where the comparison shows a match, computer readable program code means for defining code to return execution to the first instruction in the defined block of self-modifying code where the comparison shows no match, and computer readable program code means for defining code to permit the remainder of the helper code to be executed to carry out modifications in the defined block of self-modifying code, including as a last step an atomic store to replace the self-loop instruction with a modified instruction, where the comparison shows a match.

According to another aspect of the present invention there is provided the above computer program product, further including computer readable program code means for defining the first instruction in the defined block of self-modifying code to be a call instruction to the helper code and for defining the unreserved lock value to be calculated in the helper code based on the return call instruction address passed to the helper code.

According to another aspect of the present invention there is provided the above computer program product, further including computer readable program code means for defining the first instruction in the defined block of self-modifying code to be a call instruction to the helper code and for storing the unreserved lock value as a binary encoding of the call instruction available to the helper code.

According to another aspect of the present invention there is provided the above computer program product in which the helper code is loaded at a non-boundary location in memory.

According to another aspect of the present invention there is provided the above computer program product, further including computer readable program code means for defining the first instruction in the defined block of self-modifying code to be an illegal instruction to interact with a defined trap handler to pass control to the helper code, and for defining the unreserved lock value to be the binary encoding of the illegal instruction.

According to another aspect of the present invention there is provided the above computer program product in which the helper code replaces unresolved references in the defined block of self-modifying code.

According to another aspect of the present invention there is provided a method for locking self-modifying code in a multi-thread environment, the self-modifying code including helper code callable to modify instructions in a defined block of the self-modifying code, the method including the steps of:

defining an atomic compare and exchange instruction in the locking mechanism,
      the defined compare and exchange instruction carrying out a comparison of an unreserved lock value with a first instruction in the defined block of self-modifying code,
      the defined compare and exchange instruction exchanging the first instruction in the defined block of self-modifying code with a self-loop instruction, where the comparison shows a match
   defining code to return execution to the first instruction in the defined block of self-modifying code where the comparison shows no match, and
   defining code to permit the remainder of the helper code to be executed to carry out modifications in the defined block of self-modifying code, including as a last step an atomic store to replace the self-loop instruction with a modified instruction, where the comparison shows a match.

According to another aspect of the present invention there is provided the above method, further including the steps of generating the first instruction in the defined block of self-modifying code to be a call instruction to the helper code and of defining code for calculating the unreserved lock value in the helper code based on the return address passed to the helper code.

According to another aspect of the present invention there is provided the above method, further including the steps of generating the first instruction in the defined block of self-modifying code to be a call instruction to the helper code and of defining code for storing the unreserved lock value as a binary encoding of the call instruction available to the helper code.

According to another aspect of the present invention there is provided the above method, further including the step of defining code for loading the helper code at a non-boundary location in memory.

According to another aspect of the present invention there is provided the above method, further including the steps of generating the first instruction in the defined block of self-modifying code to be an illegal instruction to interact with a defined trap handler to pass control to the helper code, and of defining code for setting the unreserved lock value to be the binary encoding of the illegal instruction.

According to another aspect of the present invention there is provided the above method, in which the helper code replaces unresolved references in the defined block of self-modifying code.

According to another aspect of the present invention there is provided a locking mechanism for self-modifying code in a multi-thread computer system, the self-modifying code including helper code callable to modify instructions in a defined block of the self-modifying code, the locking mechanism including an atomic compare and exchange instruction, the compare and exchange instruction carrying out a comparison of an unreserved lock value with a first instruction in the defined block of self-modifying code, the compare and exchange instruction exchanging the first instruction in the defined block of self-modifying code with a self-loop instruction, where the comparison shows a match, the locking mechanism including code defined to return execution to the first instruction in the defined block of self-modifying code where the comparison shows no match, the locking mechanism including code defined to permit the remainder of the helper code to be executed to carry out modifications in the defined block of self-modifying code, including as a last step an atomic store to replace the self-loop instruction with a modified instruction, where the comparison shows a match.

According to another aspect of the present invention there is provided a method for generating executable computer code to define a locking mechanism for runtime resolution of unresolved references in a specified block of executable code in a multithread environment, the method including the following steps:

inserting a call instruction at the first instruction address in the specified block of executable code, the call instruction branching to a block of helper code,
   defining a lock mechanism in the helper code by
      including instructions in the helper code to calculate the binary encoding for the call instruction at the first instruction address,
      including an atomic compare and exchange instruction in the helper code, the instruction having arguments defined to be the calculated binary encoding for the call instruction, the binary encoding for a self loop instruction, and the first instruction address,
      including a branch to the first instruction address in the specified block of executable code, the branch being taken when the atomic compare and exchange instruction returns no match between the calculated binary encoding for the call instruction and the contents at the first instruction address,
   defining instructions in the helper code for the resolution of unresolved references in the specified block of executable code, the last such instruction being defined to be an atomic store instruction to replace the instruction at the first instruction address.

According to another aspect of the present invention there is provided a computer program product including a computer usable medium having computer readable program code means embodied in the medium for carrying out the above method.

Advantages of the present invention include a locking system that provides local locking, is efficient in the resulting runtime code space and results in an optimal code sequence in the self-modifying code after it has been modified.

DETAILED DESCRIPTION OF THE PREFERRED EMBODIMENT

Figure 1:
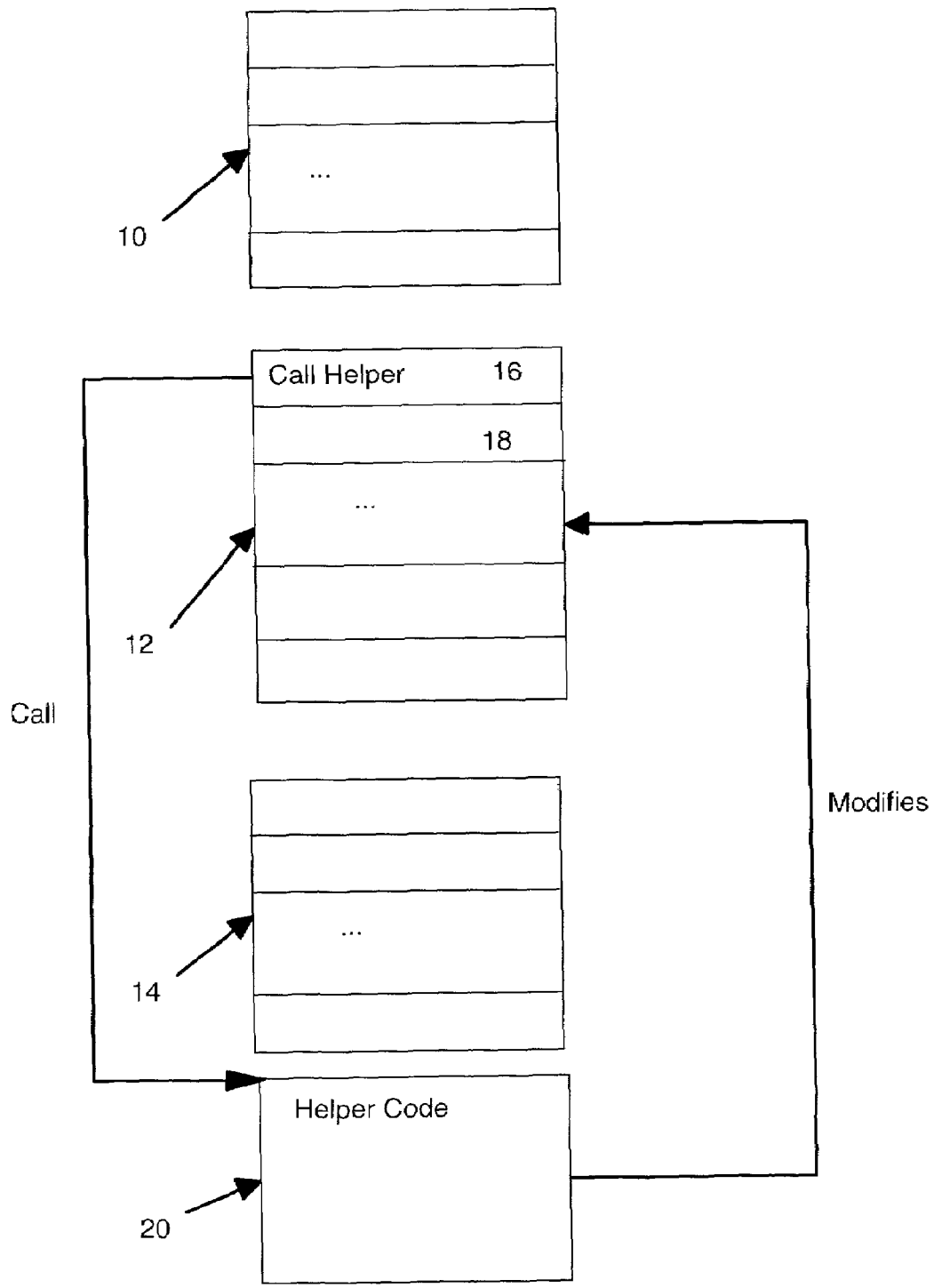
FIG. 1 is a block diagram illustrating sample code sequences for self-modifying code according to the preferred embodiment.

FIG. 1 shows a block diagram illustrating an example code sequence in which block 10 represents a sequence of instructions leading up to the sequence to be modified, block 12 represents the sequence of instructions to be modified, and block 14 represents instructions following the sequence to be modified. Instruction 16 within block 10 is shown in FIG. 1 to have the call to the routine which modifies block 12 instructions at runtime. Instruction 18 in FIG. 1 is the instruction following the call instruction of instruction 16. In the preferred embodiment illustrated in FIG. 1, the code to modify block 12 instruction is a reference resolving routine shown as helper code 20.

The locking mechanism of the preferred embodiment uses a compare and exchange instruction. An example of such an instruction is the cmpxchg instruction found in the instruction set for Intel Architecture x86 processors (Intel 80486-compatible processors; the instruction set is sometimes referred to as the IA32 instruction set). The instruction is an atomic compare and exchange. The cmpxchg instruction takes three arguments, for the purposes of illustration, Rx, Ry, T1. On execution, the value of Rx is compared with the contents of a memory location specified by address T1. If the value Rx matches the value stored at T1, then the value Ry replaces the contents of memory location T1, the old value of T1 is stored in Ry, and a zero flag is set to on. If the Rx value does not match the contents of address T1, then Rx is reset to be the contents of T1 and the zero flag is turned off. Other atomic compare and exchange instructions analogous to the cmpxchg instruction may be used to implement the invention.

The preferred embodiment is described with reference to the ia32 instruction set implemented on a machine supporting a runtime stack.

In the preferred embodiment, the compiler identifies an instruction sequence with unresolved references (exemplified as block 12 in FIG. 1). The compiler inserts a first call instruction in block 12 to call helper code 20. This helper code call instruction is inserted at instruction 16 in the example shown in FIG. 1. As a result, any thread executing the instructions of block 12 will first execute the helper code call instruction found at instruction 16. Helper code 20 is defined to obtain a lock and to execute only once to modify the code in block 12, as described below.

In the preferred embodiment, when helper code 20 is called by the helper code call instruction at instruction 16, the address of instruction 18 is pushed onto the runtime stack and control is transferred to the instructions of helper code 20. The lock mechanism uses the cmpxchg instruction to modify the helper code call instruction initially found at instruction 16 in block 12. The first thread to reach the cmpxchg instruction in helper code 20, by executing the (atomic) cmpxchg instruction, carries out a modification of instruction 16.

The lock mechanism for helper code 20 is implemented by helper code 20 including the cmpxchg instruction which in the preferred embodiment is used to effectively determine if the thread executing the cmpxchg instruction is the first one to reach that point in the code. This is accomplished by helper code 20 including instructions to calculate the bytes representing the helper code call instruction that was initially emitted by the compiler and loaded into instruction 16. This calculated helper code call instruction bit encoding is then compared with the actual contents of instruction 16 using the atomic cmpxchg instruction. A match of the calculated bit encoding for the helper code call instruction, and the actual contents of instruction 16 signifies that the current thread is the first one to reach the cmpxchg instruction in helper code 20.

If the compare does indicate a match, the instructions in helper code 20 carry out steps having two consequences: the helper code call instruction at instruction 16 is replaced by a spin loop instruction, and the remainder of helper code 20 will be executed by the thread. Because the replacement of the helper code call instruction at instruction 16 is carried out as part of the atomic compare and exchange instruction, the first thread to reach the cmpxchg instruction in helper code 20 will be able to execute helper code 20, but later threads will not. Expressed in terms of the lock mechanism, the first thread to execute the cmpxchg instruction will hold the lock for helper code 20. The mechanism of the preferred embodiment for achieving the lock on helper code 20 is set out in further detail below.

In the preferred embodiment, helper code 20 includes code for calculating the address of instruction 16. This is accomplished by helper code 20 popping the return address for the call instruction off the stack. Because the first instruction in block 12 is defined by the compiler to be a call instruction (to the helper code), the address for instruction 16 is computed in helper code 20 by subtracting the length of the call instruction from the return instruction address (the address of instruction 18) popped from the stack.

The relative immediate offset for helper code 20 from instruction 16 is then calculated by subtracting the return address popped from the stack from the address from the start of helper code 20. This calculated relative immediate offset is combined with the code for a call instruction to provide the calculated bit encoding for the call instruction for helper code 20 as it would be emitted at the location of instruction 16. In the preferred embodiment, the calculated call instruction is generated by shifting the relative immediate offset by 8 bits and loading the opcode for the call instruction (0xe8) into the low order byte. The result is the first 4 bytes of the binary encoding for the helper code call instruction originally generated for the call at instruction 16 by the compiler.

The compare and exchange instruction in helper code 20 is then given the following three arguments:
the calculated call instruction binary encoding (as defined above),
the self-loop instruction 2 bit binary encoding (jmp $-2 or 0xfeeb), and
the address of the original call instruction (instruction 16 in FIG. 1).

When the thread reaching the compare and exchange instruction is the first thread to do so, the compare and exchange is carried out by a comparison of the calculated call instruction with the value at the address of the original call instruction. The result is a match and therefore the value of the self loop code (jmp$-2) is copied to the location of the original call instruction (instruction 16 in FIG. 1), as part of the atomic compare and exchange.

Should a second thread reach instruction 16 after the compare and replace has been executed, that second thread will sit in the self loop spin until the instruction is altered, as described below.

If a second thread reaches instruction 16 before the compare and replace has been executed, that second thread will branch to helper code 20. When the second thread executes the compare and exchange, instruction 16 will have already been modified by the first thread (because the instruction is atomic, the first thread to reach it will always have replaced the call initially at instruction 16 with the self loop instruction). Helper code 20 is defined such that when the compare and exchange fails (the zero flag is set to off), control is returned to instruction 16. Where instruction 16 is the self loop instruction the second thread will spin on the instruction until that instruction is replaced as set out below. Once the modification of instruction 16 by helper code 20 occurs, a second thread executing at instruction 16 will continue by executing the modified instruction at instruction 16 and then continue with the other instructions in (modified) block 12.

Where a first thread acquires the lock and executes helper code 20, the modifications required to resolve the unresolved references in block 12 are carried out. The last such modification is defined to be the modification to the instruction to be located at instruction 16. The self loop instruction is replaced with the appropriate modified instruction using an atomic store operation. Any threads which had been spinning on the self loop instruction then execute the modified code in block 12 and continue with execution of block 14 code.

As will be apparent from the above, in the preferred embodiment, helper code 20 includes code that is used to implement the lock described above and also includes code that resolves references and which is used to modify the code in block 12. The mechanism of the preferred embodiment ensures that the code to modify block 12 is only executed once for each reference that is required to be resolved. By using the compare and exchange instruction in helper code 20, the preferred embodiment mechanism requires little code space to carry out the locking mechanism. Because the helper code call instruction (initially located at instruction 16 in FIG. 1) is ultimately replaced by modified code, any thread accessing block 12 (after the self loop instruction has been replaced) will be executing optimal code.

In the preferred embodiment, the helper code call instruction is 5 bytes in length. However, the cmpxchg instruction compares a two-byte word. For this reason, it is possible that the cmpxchg instruction will find a match between an already modified call instruction at instruction 16, and the calculated helper code call instruction. If this is the case, it is possible for the helper code 20 to be executed more than once. This is possible because a second or subsequent process may execute the helper code call instruction before the execution of helper code 20 replaces that instruction with the resolved reference. The cmpxchg instruction will be potentially executed more than once and the later executions will show a match between the calculated value and the actual value in instruction 16. The result will be that the helper code will be executed when the lock mechanism ought to indicate that the lock is unavailable. The result is that such processes will replace the instruction 16 instruction with the resolved reference when the replacement may have already occurred.

In the preferred embodiment, this potential unnecessary execution of helper code 20 is avoided by using the align instruction to force helper code 20 to be located at a non-boundary position in the computer memory. The compiler of the preferred embodiment generates code that has executable code for procedures aligned to start on boundaries in the computer memory. By forcing helper code 20 to be offset relative to the boundaries, the helper code call instruction will not have the same 2 low order bytes as a call instruction that may be generated by helper code 20 and written into instruction 16.

In the preferred embodiment described above, the instruction originally written to instruction 16 by the compiler is a call to helper code 20. However, an alternative implementation of the preferred embodiment is to use an illegal instruction rather than a call instruction as the original instruction at instruction 16. In such a case, the transfer of control resulting from the execution of the illegal instruction includes a check to determine whether the illegal instruction is used to branch to helper code, or is a true error. If it is the former, then the mechanism set out above is used to carry out the modification. In this alternative implementation, the trap handler will contain code to call helper code 20 and to provide the information to helper code 20 to permit the resolution of the reference under consideration. In this case an exception record which includes the address of instruction 16 will be generated by the system and made available to the trap handler.

Although a preferred embodiment of the present invention has been described here in detail, it will be appreciated by those skilled in the art that other variations may be made. For example, rather than including code in helper code 20 to calculate the binary encoding for the helper code call instruction, a variation is to store a copy of that value in memory accessible by helper code 20. Such an approach includes a cost inherent in the storage of the binary encoding but will permit the locking mechanism of the invention to be achieved. This and other variations may be made without departing from the spirit of the invention or the scope of the appended claims.

The embodiments of the invention in which an exclusive property or privilege are claimed are defined as follows:

1. A computer program product comprising a computer usable medium tangibly embodying computer readable program code for defining code to provide a locking mechanism for self-modifying code in a multi-thread environment, the self-modifying code comprising helper code callable to modify instructions in a defined block of the self-modifying code, said computer program product comprising:

computer readable program code means for defining an atomic compare and exchange instruction in the locking mechanism, the defined atomic compare and exchange instruction for carrying out a comparison of an unreserved lock value with a first instruction in the defined block of self-modifying code, the defined atomic compare and exchange instruction for exchanging the first instruction in the defined block of self-modifying code with a self-loop instruction where the comparison indicates that the unreserved lock value matches the first instruction in the defined block of self-modifying code;

computer readable program code means for defining code to return execution to the first instruction in the defined block of self-modifying code where the comparison indicates that the unreserved lock value does not match the first instruction in the defined block of self-modifying code; and computer readable program code means for defining code to permit the remainder of the helper code to be executed to carry out modifications in the defined block of self-modifying code, including as a last step an atomic store to replace the self-loop instruction with a modified instruction, where the comparison indicates that the unreserved lock value matches the first instruction in the defined block of self-modifying code.

2. The computer program product of claim 1 further comprising computer readable program code means for defining the first instruction in the defined block of self-modifying code to be a call instruction to the helper code and for defining the unreserved lock value to be calculated in the helper code based on a return call instruction address passed to the helper code.

3. The computer program product of claim 1 further comprising computer readable program code means for defining the first instruction in the defined block of self-modifying code to be a call instruction to the helper code and for storing the unreserved lock value as a binary encoding of the call instruction available to the helper code.

4. The computer program product of claim 2 in which the helper code is loaded at a non-boundary position in memory.

5. The computer program product of claim 1 further comprising computer readable program code means for defining the firm instruction in the defined block of self-modifying code to be an illegal instruction to interact with a defined trap handler to pass control to the helper code, and for defining the unreserved lock value to be the binary encoding of the illegal instruction.

6. The computer program product of claim 1 in which the helper code replaces unresolved references in the defined block of self-modifying code.

7. A computer program product comprising a computer usable medium tangibly embodying computer readable program code means for defining code to provide a locking mechanism for self-modifying code in a multi-thread environment, the self-modifying code comprising helper code callable to resolve unresolved references in a defined block of the self-modifying code, the helper code loaded at a non-boundary position in memory, said computer program product comprising:

computer readable program code means for defining an atomic compare and exchange instruction in the locking mechanism, the defined atomic compare and exchange instruction for carrying out a comparison of an unreserved lock value with a first instruction in the defined block of self-modifying code, the defined atomic compare and exchange instruction for exchanging the first instruction in the defined block of self-modifying code with a self-loop instruction where the comparison indicates that the unreserved lock value matches the first instruction in the defined block of self-modifying code;

computer readable program code means for defining code to return execution to the first instruction in the defined block of self-modifying code where the comparison indicates that the unreserved lock value does not match the first instruction in the defined block of self-modifying code;

computer readable program code means for defining code to permit the remainder of the helper code to be executed to resolve references in the defined block of self-modifying code, including as a last step an atomic store to replace the self-loop instruction with a modified instruction where the comparison indicates that the unreserved lock value matches the first instruction in the defined block of self-modifying code; and computer readable program code means for defining the first instruction in the defined block of self-modifying code to be a call instruction to the helper code and the unreserved lock value is calculated in the helper code based on a return address passed to the helper code.

8. A method for locking self-modifying code in a multi-thread environment, the self-modifying code comprising helper code callable to modify instructions in a defined block of the self-modifying code, the method comprising:

defining an atomic compare and exchange instruction in the locking mechanism, the defined atomic compare and exchange instruction carrying out a comparison of an unreserved lock value with a first instruction in the defined block of self-modifying code, the defined atomic compare and exchange instruction exchanging the first instruction in the defined block of self-modifying code with a self-loop instruction where the comparison indicates that the unreserved lock value matches the first instruction in the defined block of self-modifying code;

defining code to return execution to the first instruction in the defined block of self-modifying code where the comparison indicates that the unreserved lock value does not match the first instruction in the defined block of self-modifying code; and defining code to permit the remainder of the helper code to be executed to carry out modifications in the defined block of self-modifying code, including as a last step an atomic store to replace the self-loop instruction with a modified instruction where the comparison indicates that the unreserved lock value matches the first instruction in the defined block of self-modifying code.

9. The method of claim 8 further comprising generating the first instruction in the defined block of self-modifying code to be a call instruction to the helper code and of defining code for calculating the unreserved lock value in the helper code based on a return address passed to the helper code.

10. The method of claim 8 further comprising generating the first instruction in the defined block of self-modifying code to be a call instruction to the helper code and of defining code for storing the unreserved lock value as a binary encoding of the call instruction available to the helper code.

11. The method of claim 9 further comprising the step of defining code for loading the helper code at a non-boundary position in memory.

12. The method of claim 8 further comprising the steps of generating the first instruction in the defined block of self-modifying code to be an illegal instruction to interact with a defined trap handler to pass control to the helper code, and of defining code for setting the unreserved lock value to be the binary encoding of the illegal instruction.

13. The method of claim 8 in which the helper code replaces unresolved references in the defined block of self-modifying code.

14. A lacking mechanism for self-modifying code in a multi-thread computer system, the self-modifying code comprising helper code callable to modify instructions in a defined block of the self-modifying code, the locking mechanism comprising:

an atomic compare and exchange instruction, the atomic compare and exchange instruction for carrying out a comparison of an unreserved lock value with a first instruction in the defined block of self-modifying code, the atomic compare and exchange instruction for exchanging the first instruction in the defined block of self-modifying code with a self-loop instruction where the comparison indicates that the unreserved lock value matches the first instruction in the defined block of self-modifying code;

the locking mechanism including code defined to return execution to the first instruction in the defined block of self-modifying code where the comparison indicates that the unreserved lock value does not match the first instruction in the defined block of self-modifying code;

the locking mechanism including code defined to permit the remainder of the helper code to be executed to carry out modifications in the defined block of self-modifying code, including as a last step an atomic store to replace the self-loop instruction with a modified instruction where the comparison indicates that the unreserved lock value matches the first instruction in the defined block of self-modifying code.

15. The locking mechanism of claim 14 in which the first instruction in the defined block of self-modifying code is a call instruction to the helper code and the unreserved lock value is calculated in the helper code based on a return address passed to the helper code.

16. The locking mechanism of claim 14 in which the first instruction in the defined block of self-modifying code is a call instruction to the helper code and the unreserved lock value is a stored binary encoding of the call instruction available to the helper code.

17. The locking mechanism of claim 15 in which the helper code is stored at a non-boundary position in memory.

18. The locking mechanism of claim 14 in which the first instruction in the defined block of self-modifying code is an illegal instruction defined to interact with a defined trap handler to pass control to the helper code, and in which the unreserved lock value is the binary encoding of the illegal instruction.

19. The locking mechanism of claim 14 in which the helper code replaces unresolved references in the defined block of self-modifying code.

20. A method for generating executable computer code to define a locking mechanism for runtime resolution of unresolved references in a specified block of executable code in a multithread environment, the method comprising:
  a) inserting a call instruction at a first instruction address in the specified block of executable code, the call instruction branching to a block of helper code;
  b) defining the lock mechanism in the helper code by:
    i) including instructions in the helper code to calculate a binary encoding for the call instruction at the first instruction address,
    ii) including an atomic compare and exchange instruction in the helper code, said included instruction having arguments defined to be a calculated binary encoding for the call Instruction, the calculated binary encoding for a self loop instruction, and the first instruction address,
    iii) including a branch to the first instruction address in the specified block of executable code, the branch being taken when the included atomic compare and exchange instruction identifies that the calculated binary encoding for the call instruction does not match contents at the first instruction address;
  c) defining instructions in the helper code for the resolution of unresolved references in the specified block of executable code, the last such instruction being defined to be and an atomic store instruction to replace the instruction at the first instruction address.

21. A computer program product comprising a computer usable medium tangibly embodying computer readable program code means for generating executable computer code to define a locking mechanism for runtime resolution unresolved references in a specified block of executable code in a multithread environment, the code means comprising:
  a) means for inserting a call instruction at a first instruction address in the specified block of executable code, the call instruction branching to a block of helper code;
  b) means for defining the lock mechanism in the helper code by:
    i) including instructions in the helper code to calculate a binary encoding for the call instruction at the first instruction address,
    ii) including an atomic compare and exchange instruction in the helper code, said included instruction having arguments defined to be a calculated binary encoding for call instruction, the calculated binary encoding for a self loop instruction, and the first instruction address,
    iii) including a branch to the first instruction address in the specified block of executable code, the branch being taken when the included atomic compare and exchange instruction identifies that the calculated binary encoding for the call instruction does not match contents at the first instruction address; and
  c) means for defining instructions in the helper code for the resolution of unresolved references in the specified block of executable code, the last such instruction being defined to be and an atomic store instruction to replace the instruction at the first instruction address.

* * * * *